(12) United States Patent
Bennett, Jr.

(10) Patent No.: US 11,325,518 B2
(45) Date of Patent: *May 10, 2022

(54) RECOVERY UNIT FOR RECOVERING VEHICLES

(71) Applicant: CGB Holdings, L.L.C., Kennedale, TX (US)

(72) Inventor: James D. Bennett, Jr., Fort Worth, TX (US)

(73) Assignee: CGB Holdings, L.L.C., Kennedale, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/148,878

(22) Filed: Jan. 14, 2021

(65) Prior Publication Data

US 2022/0009400 A1  Jan. 13, 2022

Related U.S. Application Data

(63) Continuation of application No. 16/909,607, filed on Jun. 23, 2020, now Pat. No. 10,894,500, which is a continuation of application No. 16/675,807, filed on Nov. 6, 2019, now Pat. No. 10,688,905.

(51) Int. Cl.
*B60P 3/00* (2006.01)
*B60P 3/12* (2006.01)

(52) U.S. Cl.
CPC .................................. *B60P 3/125* (2013.01)

(58) Field of Classification Search
CPC ... B66D 1/18; B66D 1/36; B66D 1/38; B66D 1/60; B66D 3/26; B60P 3/125; B66F 9/061; B66F 9/0655; B66C 23/36; B66C 23/38; B66C 23/44; B66C 23/46; B66C 23/66

See application file for complete search history.

(56) References Cited

U.S. PATENT DOCUMENTS

| | | | |
|---|---|---|---|
| 2,264,569 A | 12/1941 | Holmes | |
| 2,283,443 A | 5/1942 | Klein | |
| 2,321,549 A | 6/1943 | Holmes | |
| 2,453,184 A | 11/1948 | Berry | |

(Continued)

OTHER PUBLICATIONS

Notice of Allowance dated Apr. 1, 2020 for related U.S. Appl. No. 16/675,807.

(Continued)

*Primary Examiner* — Emmanuel M Marcelo
(74) *Attorney, Agent, or Firm* — James E. Walton

(57) ABSTRACT

A recovery system for recovering wrecked vehicles in difficult-to-access locations generally includes a frame, a front plate, a rear plate with a mounting system for mounting the recovery system to an operating vehicle, a guide shaft and guide wheel, a boom assembly, a horse head assembly mounted in a cable sleeve in a pivot end of the boom assembly, a winch, and a cable running from the winch over and along the boom and through the horse head assembly. The horse head assembly generally includes a clevis, a clevis pin, a sheave wheel, and a cable guide. The clevis preferably rotates within the cable sleeve with respect to the boom assembly, the cable guide preferably pivots on top of the boom assembly, and the sheave wheel and cable guide preferably freely rotate on the clevis pin and preferably translate along the clevis pin.

18 Claims, 14 Drawing Sheets

(56) References Cited

U.S. PATENT DOCUMENTS

| | | | |
|---|---|---|---|
| 3,137,401 A | 6/1964 | Curtis | |
| 3,313,432 A | 4/1967 | Sheldrew | |
| 3,662,967 A | 5/1972 | Nowell | |
| 3,841,507 A | 10/1974 | Barwise | |
| 3,843,093 A | 10/1974 | Thompson | |
| 4,202,453 A | 5/1980 | Wilkes, Jr. | |
| 4,215,850 A * | 8/1980 | Haase | B66D 1/14 254/339 |
| 4,337,925 A | 7/1982 | Shannon | |
| 4,383,807 A | 5/1983 | Bubik | |
| 4,384,817 A | 5/1983 | Peterson | |
| 4,515,282 A | 5/1985 | Falch | |
| 4,569,422 A | 2/1986 | Hoffman | |
| 4,600,353 A | 7/1986 | Phillips, Jr. | |
| 4,737,066 A | 4/1988 | Allison, Jr. | |
| 5,330,122 A | 7/1994 | Wood | |
| 5,387,071 A | 2/1995 | Pinkston | |
| 6,494,437 B1 * | 12/2002 | Boyer | B66D 5/08 254/323 |
| 7,344,120 B2 * | 3/2008 | McFarland | B66D 1/00 224/511 |
| 10,688,905 B1 | 6/2020 | Bennett, Jr. | |
| 2003/0230744 A1 * | 12/2003 | Rawlinson | B66D 1/36 254/323 |
| 2004/0105746 A1 | 6/2004 | Nolasco | |
| 2005/0111948 A1 | 5/2005 | Nolasco | |
| 2008/0038106 A1 | 2/2008 | Spain | |
| 2008/0279667 A1 | 11/2008 | Addleman | |
| 2009/0087266 A1 | 4/2009 | Styck | |
| 2009/0152227 A1 | 6/2009 | Thompson | |
| 2009/0263222 A1 | 10/2009 | Kuriakose | |
| 2009/0285662 A1 | 11/2009 | Addleman | |
| 2011/0182706 A1 | 7/2011 | Marola | |
| 2012/0145980 A1 * | 6/2012 | Harrison | B60D 1/02 254/323 |
| 2012/0199543 A1 | 8/2012 | Bell | |
| 2012/0199544 A1 | 8/2012 | Aus | |
| 2012/0319064 A1 * | 12/2012 | Selkowitz | B66C 23/48 254/323 |
| 2014/0252285 A1 * | 9/2014 | Genoe | B66C 23/44 254/280 |
| 2015/0284219 A1 | 10/2015 | McConnell | |
| 2016/0137120 A1 | 5/2016 | Vink, Jr. | |
| 2016/0167933 A1 | 5/2016 | Birch | |
| 2018/0118081 A1 | 5/2018 | Jaeger | |
| 2018/0147901 A1 * | 5/2018 | Cramp | B60R 19/34 |
| 2019/0337776 A1 | 11/2019 | Fanello | |

OTHER PUBLICATIONS

Office Action dated Aug. 6, 2020 for related U.S. Appl. No. 16/909,607.

Amendment dated Oct. 22, 2020 for related U.S. Appl. No. 16/909,607.

Notice of Allowance dated Nov. 13, 2020 for related U.S. Appl. No. 16/909,607.

* cited by examiner

RECOVERY UNIT FOR RECOVERING VEHICLES

This application is a continuation of U.S. application Ser. No. 16/909,607, filed 23 Jun. 2020, titled "Recovery Unit for Recovering Vehicles," which is a continuation of U.S. application Ser. No. 16/675,807, filed 6 Nov. 2019, titled "Recovery Unit for Recovering Vehicles," both of which are incorporated herein by reference for all purposes.

BACKGROUND

1. Field of the Invention

The present invention relates generally to improvements in towing and recovering systems for recovering vehicles, and more specifically to recovery systems for recovering vehicles that have gone off the road.

2. Description of Related Art

Vehicle recovery systems and towing systems are generally necessary for recovering wrecked vehicles. However, wrecked vehicles are sometimes located in difficult-to-access environments, such as muddy or slippery surfaces, on steep slopes, or on rough or uneven terrain. There therefore exists a need for vehicles recovery systems that may be mounted to operating vehicles capable of navigating such terrain, such as skid steer vehicles, rough-terrain forklifts, tractors, or other such industrial or agricultural machinery. Some examples of such recovery systems do exist.

Some examples of recovery systems capable of being mounted to rough-terrain capable operating vehicles do exist. However, such systems have certain shortcomings, including but not limited to, strength, flexibility, reliability, or operating systems. There therefore exists a need for an improved recovery system that is capable of improved operating methods, capable of being driven by or controlled from the operating vehicle, capable of recovering heavy wrecked vehicles, or capable of directing a towing or winching cable at particular or difficult angles and directions in order to pull vehicles in awkward or difficult-to-access orientations. Such a system is disclosed below.

BRIEF DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
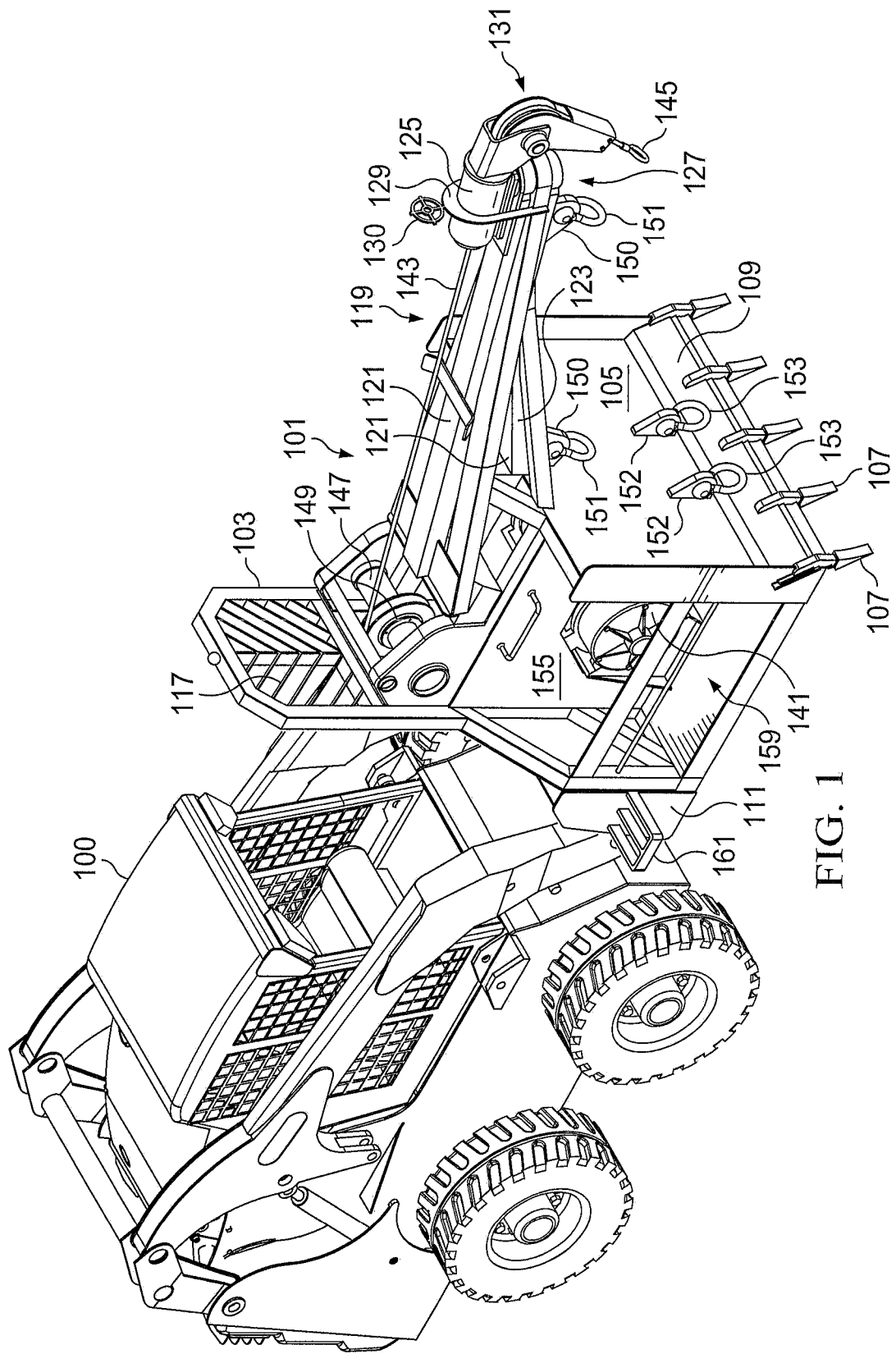
FIG. 1 is a perspective view of vehicle recovery system mounted on a skid steer according to the preferred embodiment.

While the assembly and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, combinations, and alternatives falling within the spirit and scope of the present application as defined by the appended claims.

DETAILED DESCRIPTION OF THE PREFERRED EMBODIMENT

Illustrative embodiments of the recovery unit according to the present application are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to FIG. 1, recovery system 101 is shown mounted to an operating vehicle 100, such as a skid steer tractor, of the type commonly known in the art. Recovery system 101 preferably mounts and secures to operating vehicle 100 via a bayonet-type locking mount, which is a commonly understood component of skid steers as known within the art. Recovery system 101 may be either a separate universal vehicle recovery unit that attaches to a variety of operating vehicles, or an integral component of operating vehicle 100. For example, recovery system 101 may be permanently attached to operating vehicle 100. Alternative embodiments of recovery system 101 may use other mounting means commonly known in the art, such as mounting to tractor points, mounting to forks, or other mounting methods commonly known and understood on agricultural or industrial machinery and vehicles.

Figure 2:
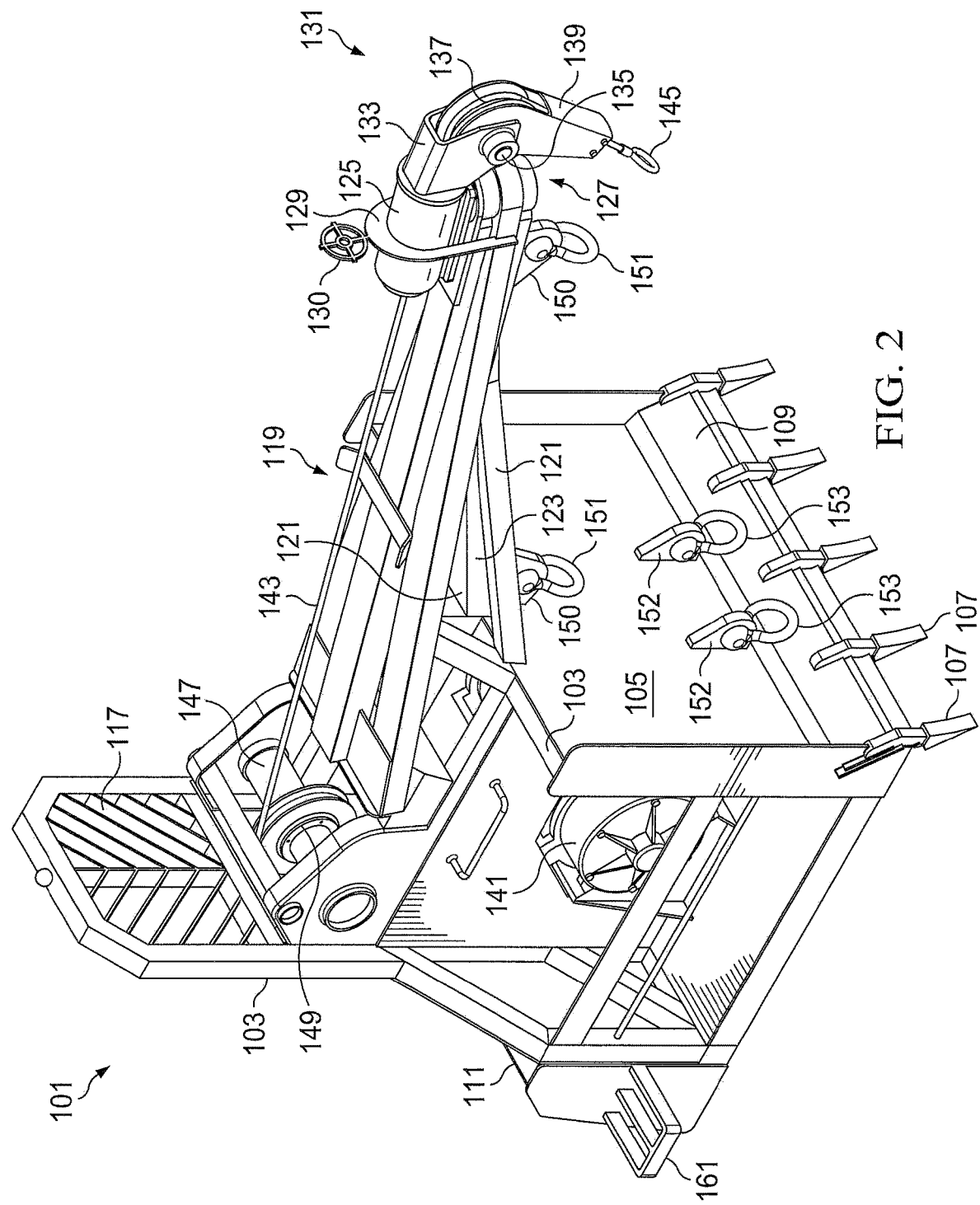
FIGS. 2 and 3 are perspective views of the vehicle recovery system according to the preferred embodiment.
Figure 3:
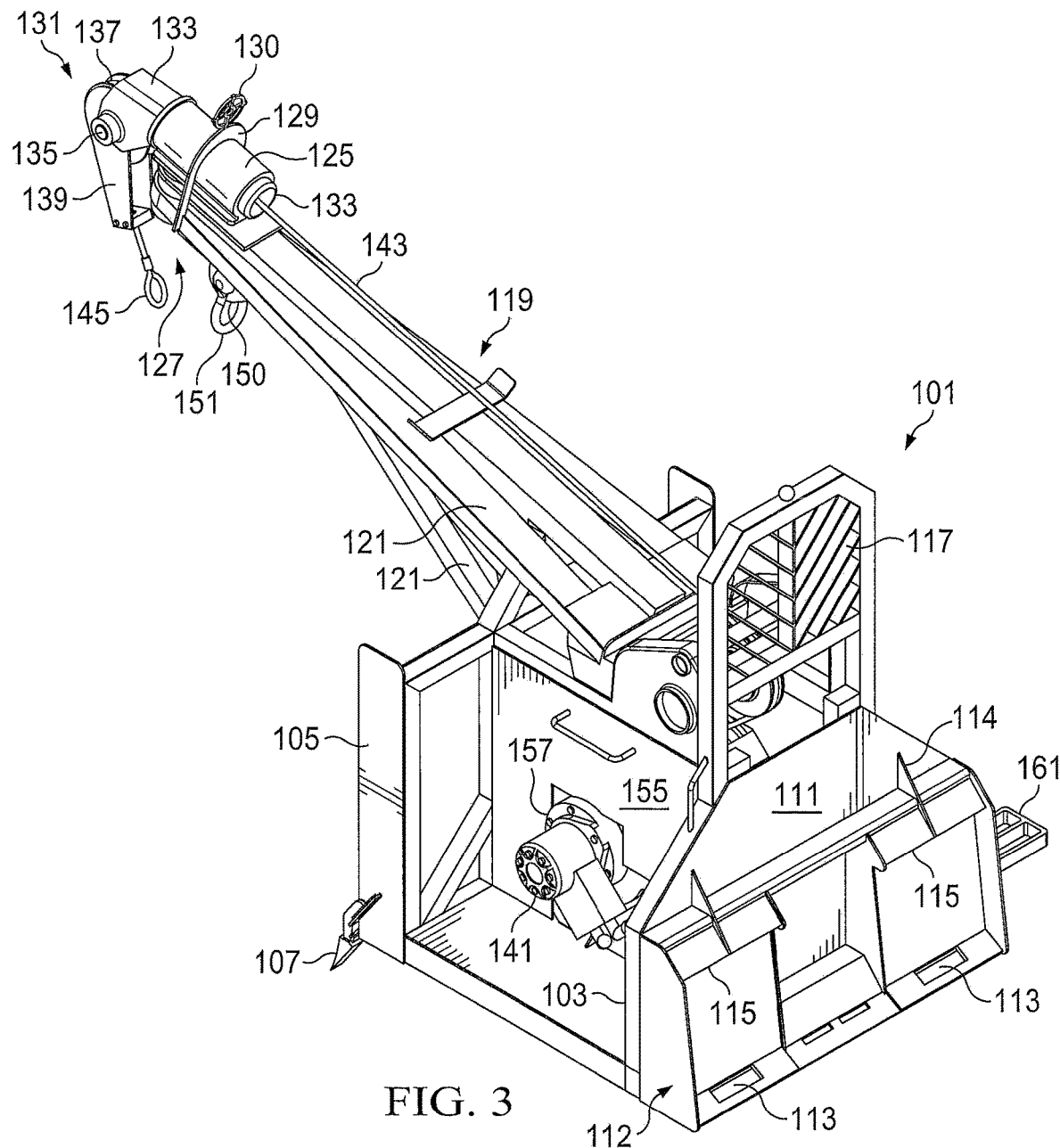

Referring now to FIGS. 1-3, recovery system 101 generally comprises a frame 103 having a front plate 105, a rear plate 111, a protective shield 117, a boom 119, a horse head assembly 131 supported on boom 119, and a winch 141.

Frame 103 is preferably a rigid steel frame, although alternative embodiments of recovery system 101 may utilize sufficiently strong and durable materials such as high strength aluminum alloys and titanium alloys. Frame 103 houses winch 141, and frame 103 supports front plate 105 and rear plate 111 to protect winch 141 from mud and debris, front plate 105 and rear plate 111 being welded to frame 103 in the preferred embodiment.

Front plate 105 has a blade edge 109 along which several teeth 107 are preferably mounted. Teeth 107 may be permanently fixed to recovery system 101 by being welded to blade edge 109 or directly to frame 103, or teeth 107 may be non-permanently fastened to recovery system 101 such as being bolted to frame 103 or blade edge 109 such that teeth 107 are removable and replaceable. In operation, teeth 107 allow an operator to angle the recovery system 101 on skid steer 100 downward and press teeth 107 into the ground or against another surface in order to anchor recovery system 101 and provide a stable pulling platform (see FIG. 4).

Rear plate 111 is supported on a rear portion of frame 103 and preferably protects winch 141 and provides a mounting system 112 for recovery system 101. Rear plate 111 contains mounting apertures 113 and mounting lips 115. As provided above, recovery system 101 preferably secures to a common bayonet-type mounting system as is commonly found on skid steer machinery. Mounting apertures 113 support locking projections (not shown) from skid steer 100 (not shown), and mounting lips 115 mount over the mounting system (not shown) of skid steer 100. Mounting system 112 may include reinforcement struts 114 to provide additional strength.

Frame 103 preferably supports and includes a protective shield 117 above and adjacent rear plate 111 that protects an operator in skid steer 100 from debris. As shown in FIGS. 1-3, protective shield 117 comprises flat planar members supported within a portion of frame 103 such that an operator in skid steer 100 can see through protective shield 117. It should be understood however that protective shield 117 may comprise any arrangement of material within frame 103 sufficient to protect an operator of skid steer 100. For example, protective shield 117 could comprise a high-strength mesh supported in frame 103 above rear plate 111 with apertures sufficient for an operator to see through, or protective shield 117 could comprise a protective transparent material such as polycarbonate or high-impact glass supported in frame 103 above rear plate 111.

Frame 103 also supports boom 119, boom 119 extending forward above front plate 105 and directing a cable 143. Boom 119 generally comprises a boom frame 121, a boom plate 123 supported on an underside of boom frame 121, a cable sleeve 125 pivotally mounted in a pivot end 127 of boom 119, and a bracket 129 supported on boom frame 121 and loosely covering cable sleeve 125. Front plate 105 preferably covers an entire front surface of frame 103. The size and shape of boom plate 123 is determined according to the specific design requirements of recovery system 101, and may effectively cover an entire underside of boom frame 121, or may cover only a particular portion or segment of boom frame 121 as shown in FIGS. 1-14. Alternatively, boom plate 123 may not be included in recovery system 101.

Boom 119 preferably is rigidly and immovably fixed onto frame 103, however, alternative embodiments of recovery system 101 may utilize a telescoping boom. For example, boom frame 121 could support a translating boom frame, horse head assembly 131 being mounted to the translating boom frame similarly to how it is mounted on boom 119 in the preferred embodiment. As shown in FIGS. 1-3, boom 119 extends rigidly forward of front plate 105 to a first length. It should be understood that the length of boom 119 forward of front plate 105 is not limited to any particular length. Boom 119 preferably extends forward of front plate 105 according to the specific design requirements of recovery system 101, and could extend forward as little as being directly adjacent front plate 105 to any length forward of front plate 105 that frame 103 is capable of supporting. For example, as shown in FIGS. 1-3, boom 119 extends forward of front plate 105 by at least two feet, but could extend in alternative embodiments to any length greater or shorter than two feet forward of front plate 105.

Horse head assembly 131 is pivotally supported within cable sleeve 125 on boom 119 and directs and protects cable 143. Horse head assembly 131 generally comprises a clevis 133, a sheave wheel 137 rotatably supported on clevis pin 135, and a cable guide 139 pivotally supported on clevis pin 135. It should be understood that cable sleeve 125 pivots on top of boom 119, that clevis 133 extends concentrically into cable sleeve 125 such that horse head assembly 131 rotates freely about an axis concentric with cable sleeve 125, and that cable guide 139 pivots about clevis pin 135. In alternative embodiments of recovery system 101, cable sleeve 125 may be rigidly fixed on top of boom 119 such that it does not pivot on top of boom 119, or clevis 133 may be rigidly fixed inside cable sleeve 125 such that horse head assembly 131 does not rotate inside cable sleeve 125 with respect to boom 119.

Clevis pin 135 is supported and covered by clevis 133 (see FIGS. 2 and 3), and it should be understood that there is a certain amount of clearance between the interior surfaces of clevis 133 and the exterior surfaces of cable guide 139 adjacent clevis pin 135 such that cable guide 139 translates a certain distance along clevis pin 135. In the preferred embodiment, there is roughly 1 inch of movement of cable guide 135 side-to-side along clevis pin 135 within clevis 133. Alternate embodiments may have greater or lesser movement of the cable guide, or may use a non-translating cable guide. According to the preferred embodiment, sheave wheel 137 rotates on clevis pin 135 within and independent of cable guide 135. According to the preferred embodiment, sheave wheel 137 is secured by cable guide 139 and translates along clevis pin 135 with cable guide 139. In alternate embodiments, there may be clearance between sheave wheel 137 and cable guide 139 such that cable guide 139 translates while sheave wheel 137 remains centered on clevis pin 135, or sheave wheel 137 may be secured to a non-translating cable guide.

Races are preferably formed into horse head assembly 131 for lubricating the components of horse head assembly 131, and grease points are preferably present at least on clevis 133 where clevis pin 135 is supported for greasing clevis pin 135. The races in horse head assembly 131 may be located and arranged according to the specific design requirements of recovery system 101, and may be present in clevis 133, sheave wheel 137, and cable guide 139.

Frame 103 houses and supports winch 141 between front plate 105 and rear plate 111, and underneath boom 119, which stores, dispenses, and retracts cable 143. Winch 141 preferably is a hydraulic winch which is driven off of a hydraulic system on skid steer 100. It is well known and common in the art that machinery such as skid steer 100 or other agricultural or industrial machinery contains hydraulic systems that hook up to and power equipment mounted to the machinery. Winch 141 in recovery system 101 preferably is similarly powered by the hydraulic system onboard skid steer 100.

The operation of winch 141 may be controlled by controls and/or a control system on recovery system 101, or because winch 141 preferably is driven off of the hydraulic system onboard skid steer 100, skid steer 100 may have onboard controls that control the feeding and retraction of cable 143 on winch 141. Alternative embodiments of recovery system 101 may instead utilize an electric winch instead of hydraulic winch 141. Winch 141 preferably may be programmed or set such that winch 141 has an auto-stop setting wherein winch 141 stops retracting cable 143 or from which winch 141 begins dispensing cable 143. Such an auto-stop is preferably set such that, when cable 143 is wound onto winch 141 as far as it will go when not in use, cable end 145 is extending from horse head assembly 131 adjacent the end an end of cable guide 139 as seen in FIG. 1. In alternative embodiments of recovery system 101, winch 141 may not support an auto-stop setting and an operator may have to manually stop retracting cable 143 onto winch 141.

A guide shaft 147 is supported on frame 103 above winch 141 and behind boom 119, with a guide wheel 149 being slidably supported on guide shaft 147. It should be understood that, in operation, cable 143 extends from winch 141 up behind guide shaft 147 and forward over guide wheel 149 such that cable 143 rests upon guide wheel 149, guide wheel 149 rotating as cable 143 is dispensed from or retracted onto winch 141. As cable 143 dispenses from or retracts onto winch 141, the alignment of cable 143 moves along the longitudinal length of winch 141. Guide wheel 149 therefore freely translates back and forth along the length of guide shaft 147 such that guide wheel 149 translates along guide shaft 147 as cable 143 moves from side to side with respect to winch 141 as cable 143 dispenses or retracts. From guide wheel 149, cable 143 extends into and through horse head assembly 131 as described below, with cable end 145 of cable 143 extending from horse head assembly 131.

It should be understood that winch 141 preferably is removably mounted to frame 103 in order that winch 141 can be removed for repair or replacement. Winch 141 preferably is further protected inside frame 103 by side plates 155. An opening 157 is preferably formed in one side plate 155 sufficiently large for inserting and removing winch 141. A utility box 159 is formed on recovery system 101 on the opposite side of winch 141 as opening 157. Utility box 159 is preferably formed at least partially by a side plate 155 and preferably provides a location to store a variety of equipment used in vehicle recovery such as cable extensions, harnesses, and attachment devices. A step 161 preferably is secured onto frame 103 near the rear of recovery system 101, or, as shown in FIGS. 1-3, is fixed onto a side of rear plate 111. Step 161 enables an operator to operate recovery system 101 or perform maintenance on recovery system 101, or enables an operator to access equipment stored in utility box 159.

A plurality of mounting points or mounting members 150 and 152 are preferably mounted to recovery system 101 to serve as mounting points for attachment devices for attaching cable 143 back onto the front of recovery system 101. For example, D-rings 151 are preferably secured to boom 119 via mounting points 150, and D-rings 153 are preferably extend from front plate 105 via mounting points 152. It should be understood that the respective D-rings are not mounted directly to their respective plates. Front plate 105 and boom plate 123 are relatively thin plates included primarily simply for protecting the operating components of recovery system 101 from mud, debris, and other impacts during the operation of recovery system 101. It should be understood that, to provide maximum strength, mounting points 150 extend through boom plate 123 to support D-rings 151 and are welded directly to boom frame 121, and that mounting points 152 extend through front plate 105 to support D-rings 153 and are welded directly to frame 103. Mounting points 150 may also be welded to boom plate 123 for additional strength and to support boom plate 123, but the primary strength and mounting for D-rings 151 is by welding mounting points 150 directly to boom frame 121. Similarly, mounting points 152 may also be welded to front plate 105 for additional strength and to support front plate 105, but the primary strength and mounting for D-rings 153 is by welding mounting points 152 directly to frame 103.

In operation, D-rings 151 and 153 provide increased pulling capacity for recovery system 101. For example, if the rated maximum load of winch 141 is 20,000 lbs., a first attachment device such as a snatch block or pulley could be attached to a 35,000 lb. vehicle, and a second attachment device on cable end 145 could be run from horse head assembly 131 through the first attachment device and back to a D-ring 153 on recovery system 101, the use of the first attachment device on the vehicle and the second attachment device on D-ring 153 effectively doubling the working capacity of winch 141 and making recovery of vehicles exceeding the rated capacity of winch 141 possible. Alternatively, D-rings 151 and 153 may also be used as direct mounting points instead of using winch 141. For example, a separate equipment cable could be attached at one end to a D-ring 151 and could be attached at the other end to the vehicle to be recovered. An operator then, instead of using winch 141 to pull the vehicle, could simply reverse skid steer 100 to directly pull the vehicle.

As shown, two mounting points 150 and two mounting points 152 are present, but it should be understood that other numbers of mounting points 150 and 152 may be used to allow for greater or fewer numbers of D-rings 151, 153. Furthermore, equipment other than D-rings may be used on mounting points 150 and 152. For example, D-rings 153 may be removed from mounting points 152 and a single solid beam (not shown) may extend between two mounting points 152 to create a single larger attachment point.

Figure 4:
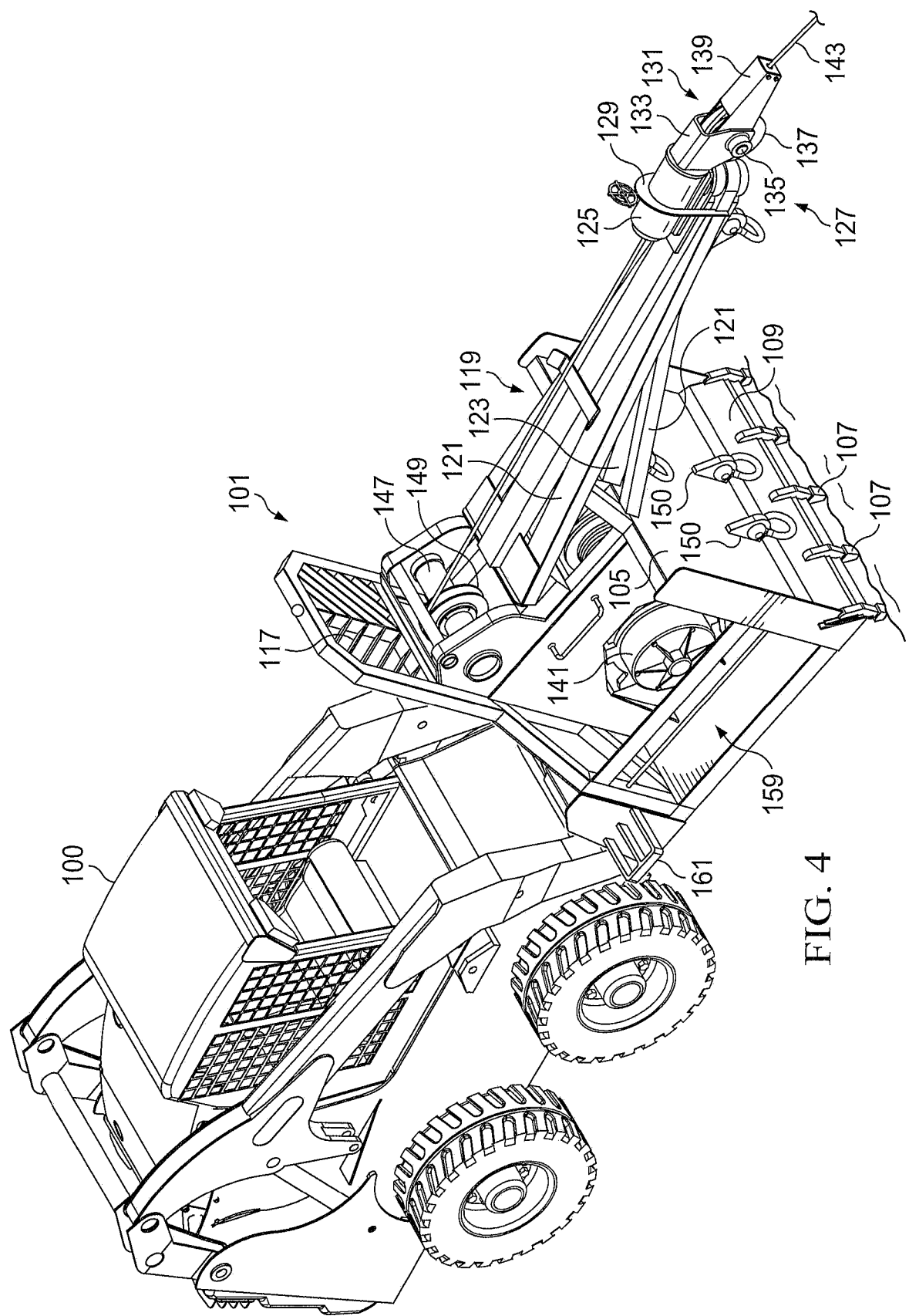
FIGS. 4 and 5 are perspective views of the vehicle recovery system in use on a skid steer according to the preferred embodiment.
Figure 5:
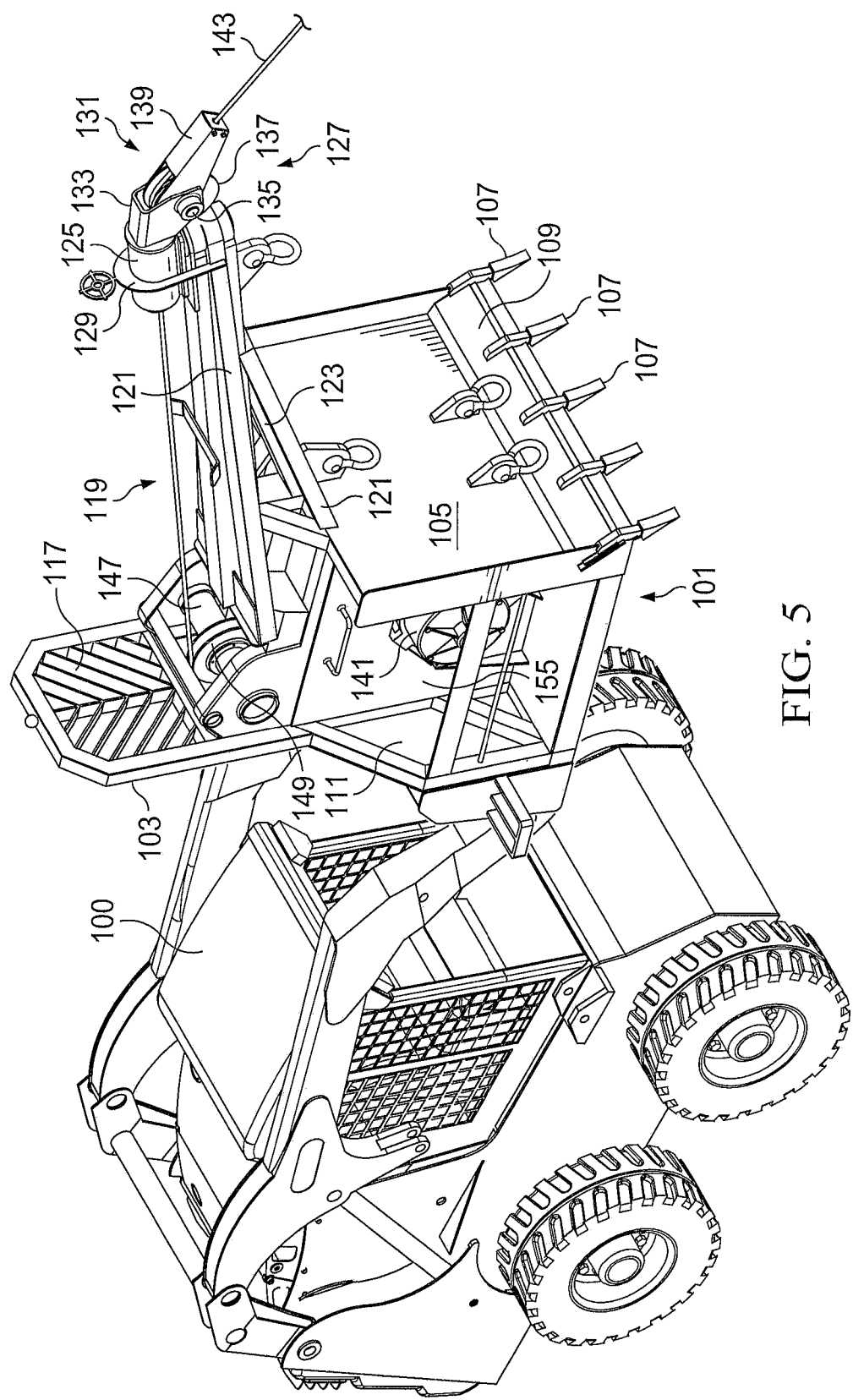

Referring now to FIGS. 4 and 5, recovery system 101 is shown in operation on skid steer 100. FIG. 4 shows that recovery system 101 is angled forward and is anchored by teeth 107 being pushed into the ground, cable 143 extending from horse head assembly 131. FIG. 5 shows recovery system 101 being angled rearward and being elevated by skid steer 100, cable 143 extending from horse head assembly 131.

Figure 6:
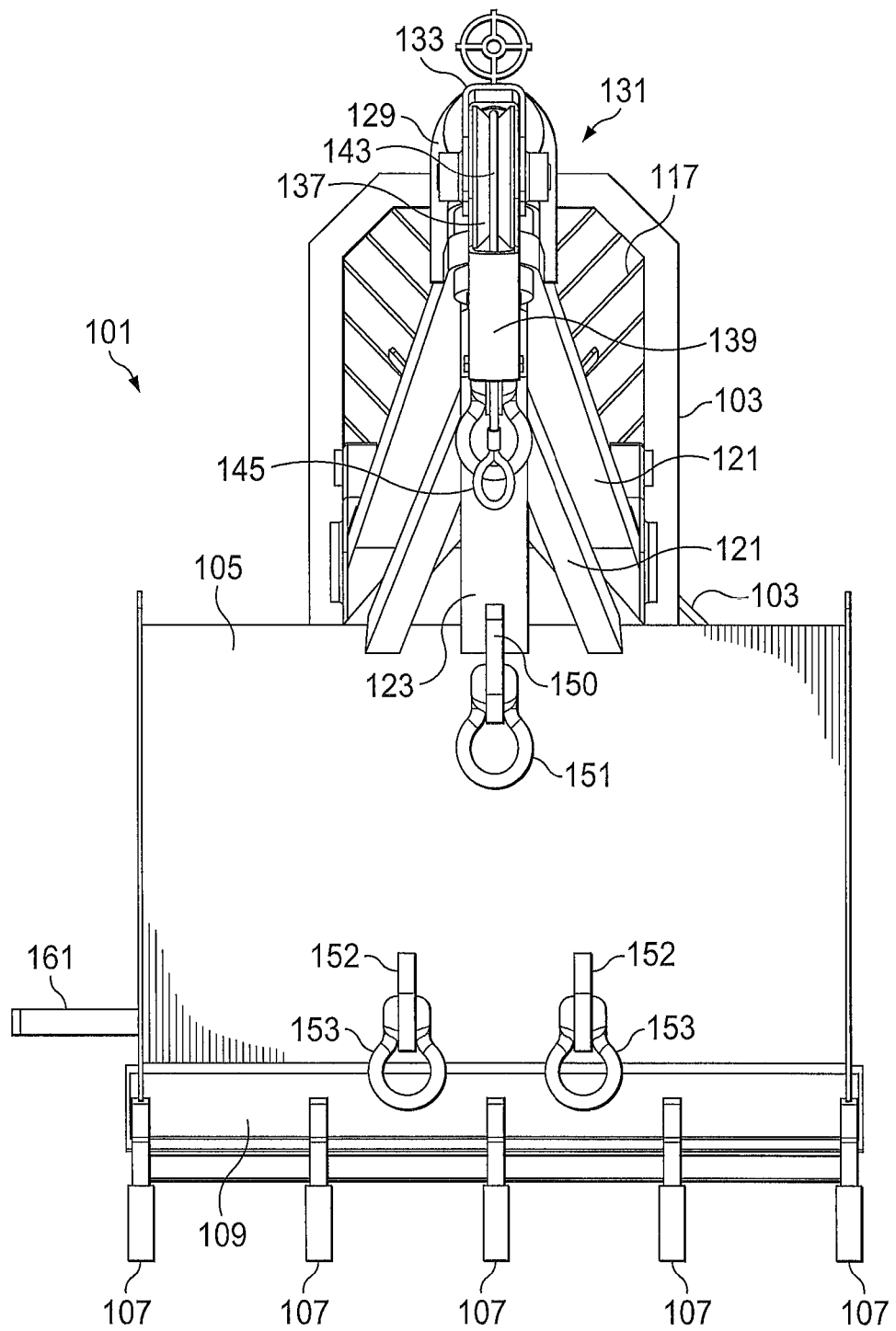
FIGS. 6-8 are front views illustrating the pivoting movement of the horse head assembly with respect to the boom according to the preferred embodiment.
Figure 7:
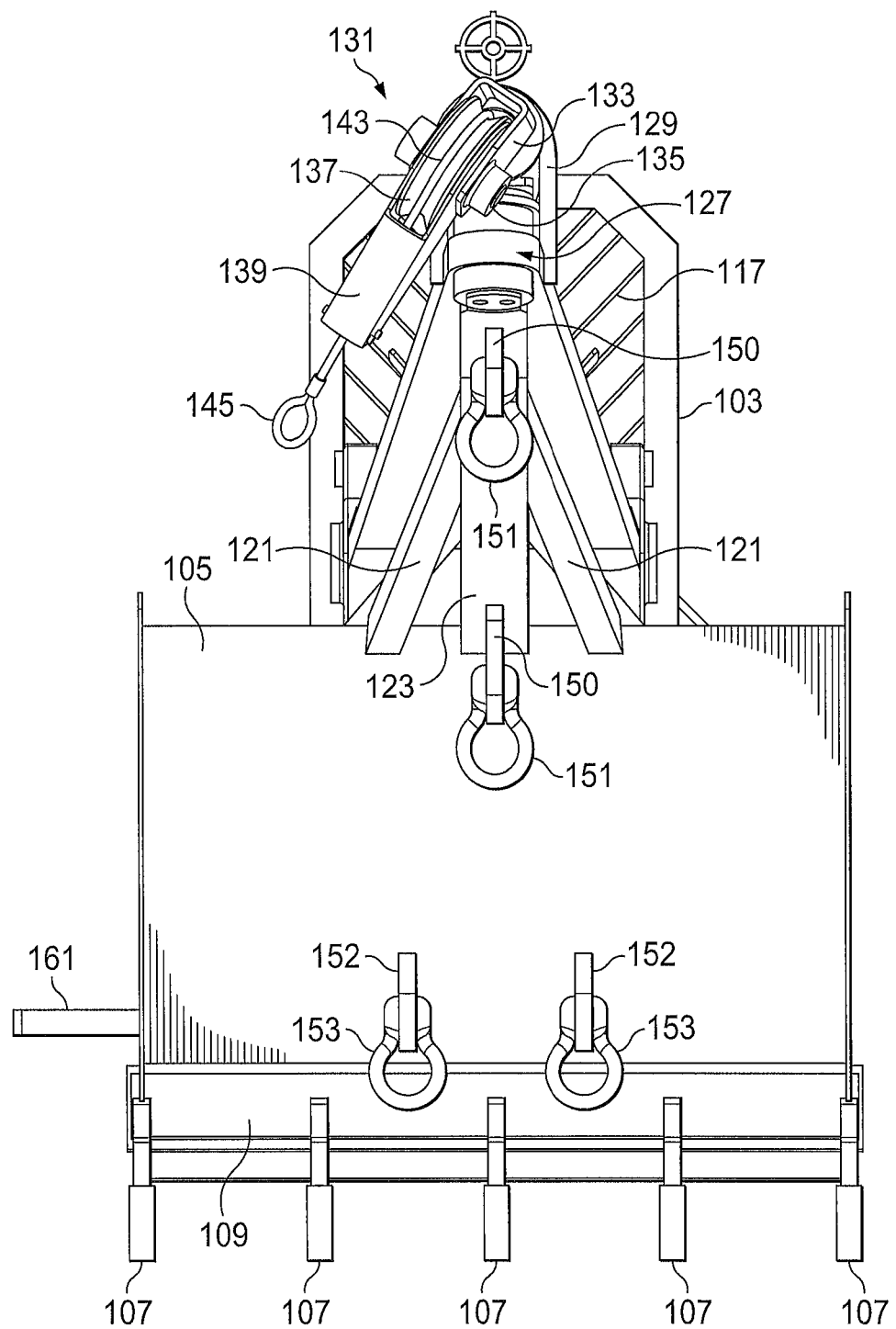
Figure 8:
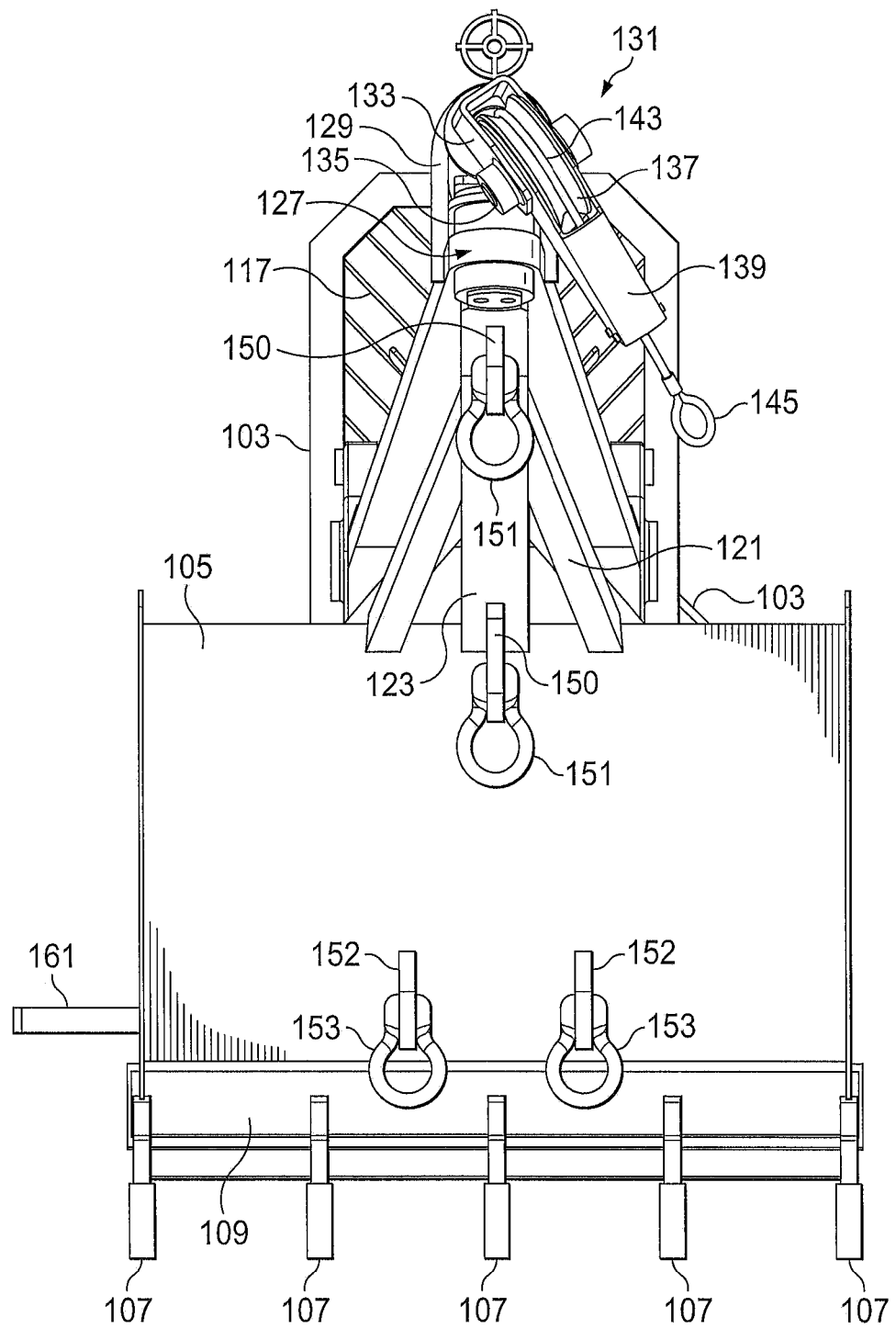

As provided above, horse head assembly 131 moves with respect to several different degrees of motion. Referring now to FIGS. 6-8, the pivoting of horse head assembly 131 is illustrated. As provided above, a portion of clevis 133 is cylindrical and extends coaxially into cable sleeve 125 (see FIGS. 2 and 3). Clevis 133, and therefore horse head assembly 131, rotates within cable sleeve 125 with respect to a central longitudinal axis of cable sleeve 125. FIG. 6 shows a front view of recovery system 101 wherein horse head assembly 131 is at a neutral position. FIG. 7 shows horse head assembly 131 rotated clockwise within cable sleeve 125 with respect to boom 119. FIG. 8 shows horse head assembly 131 rotated anti-clockwise within cable sleeve 125 with respect to boom 119. It should be understood that the rotation of horse head assembly 131 with respect to cable sleeve 125 is not limited and that horse head assembly 131 may freely rotate through complete rotations.

Figure 9:
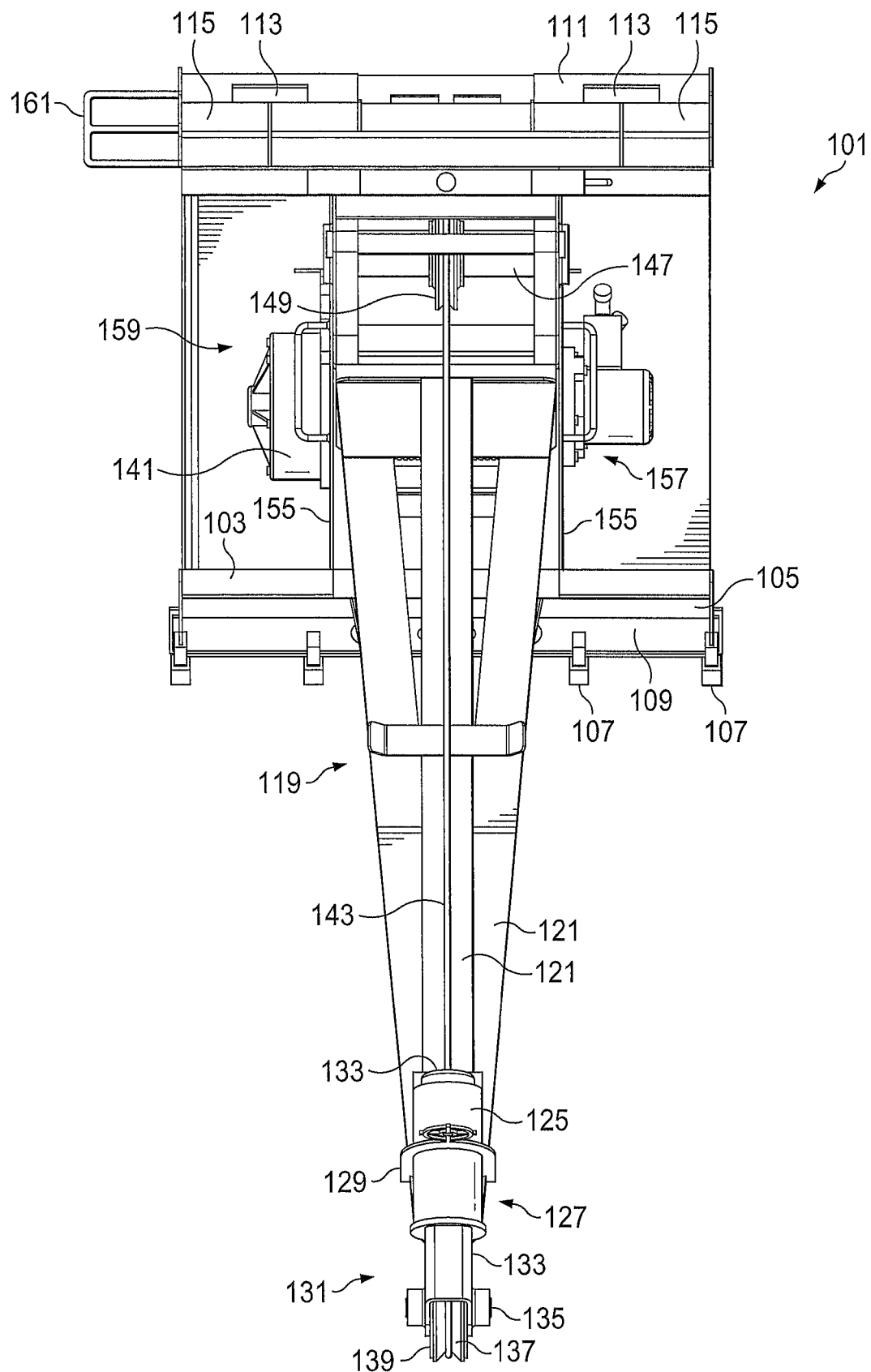
FIGS. 9-11 are top views illustrating the pivoting movement of the horse head assembly on top of the boom according to the preferred embodiment.
Figure 10:
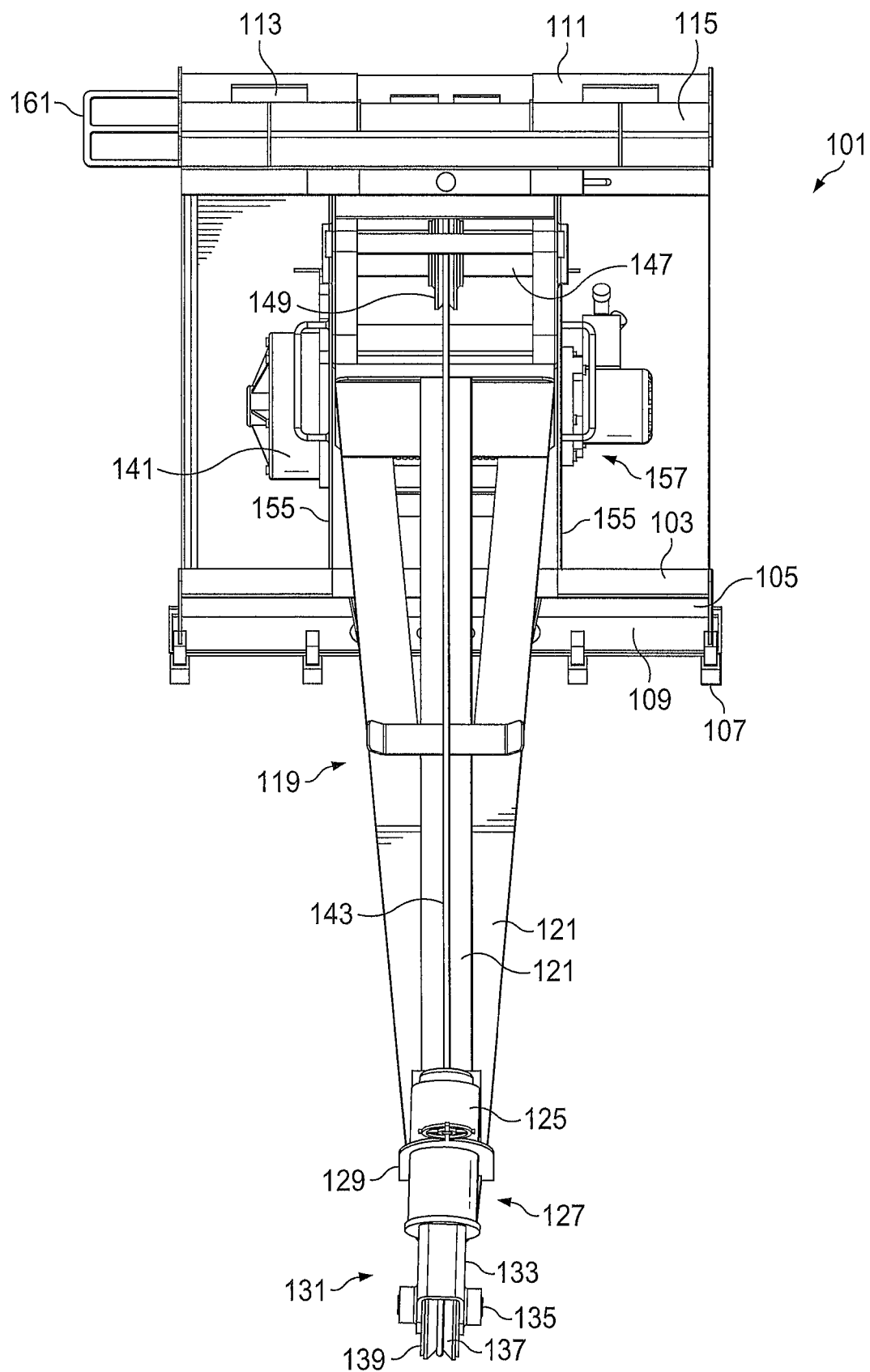
Figure 11:
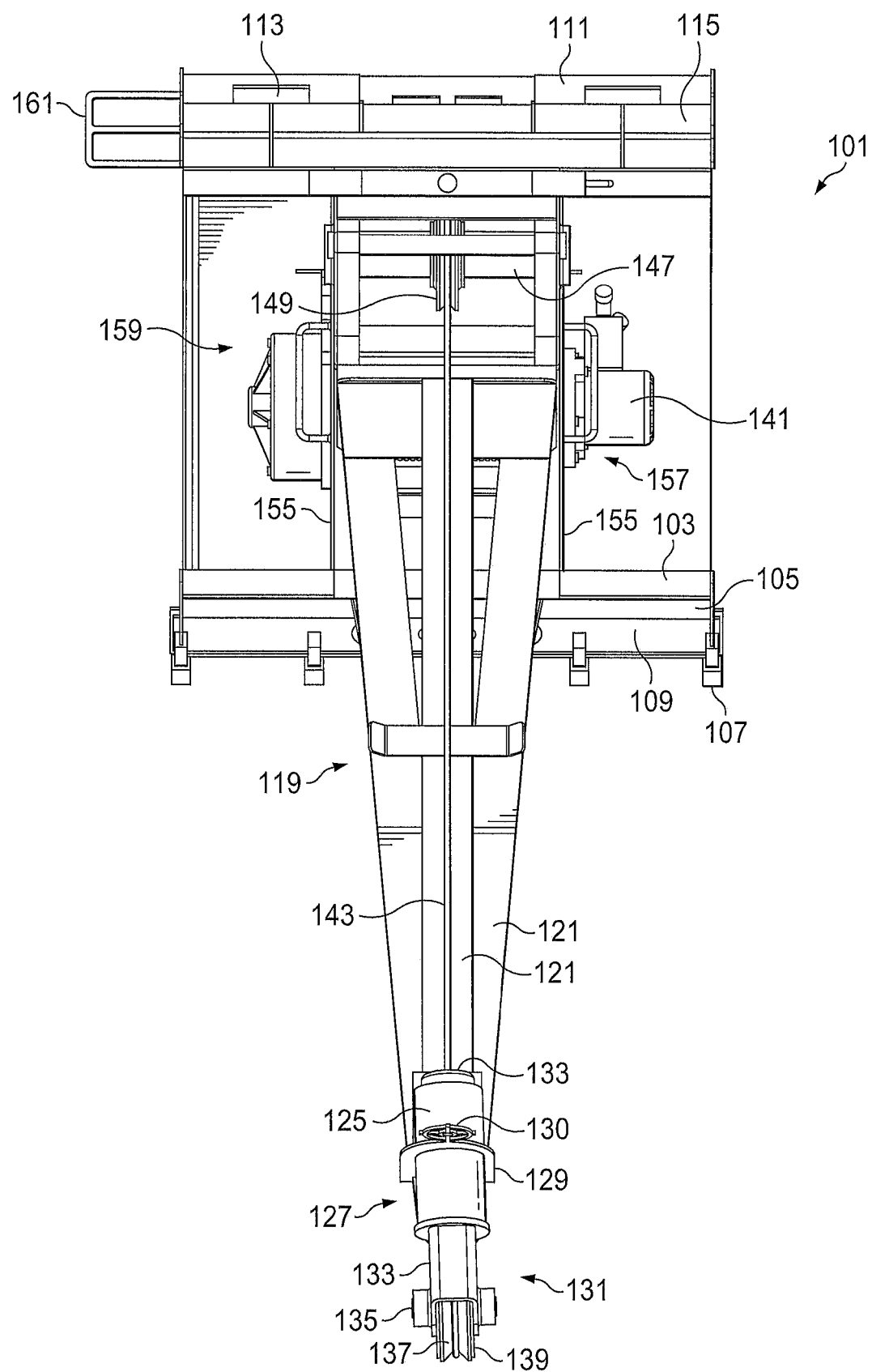

Referring now to FIGS. 9-11, the pivoting of horse head assembly 131 and cable sleeve 125 on top of boom 119 is illustrated. As seen in FIGS. 1-3, cable sleeve 125 is mounted in a pivot end 127 of boom 119. The range of motion of the pivoting of cable sleeve 125 on top of boom 119 is limited by bracket 129. Bracket 129 preferably is a rigid bracket extending on top of boom 119 over cable sleeve 125 with a sufficient clearance that cable sleeve 125 pivots between a first position and a second position. FIG. 9 shows cable sleeve 125 in a neutral position between the first position and the second position. FIG. 10 shows cable sleeve 125 in a first position on top of boom 119. FIG. 11 shows cable sleeve 125 in a second position on top of boom 119. A positioning sight 130 may optionally be mounted on top of bracket 129 to aid an operator in aligning boom 119 with a wrecked vehicle to be recovered. Alternative embodiments of vehicle recovery system 101 may not include positioning sight 130.

Figure 12:
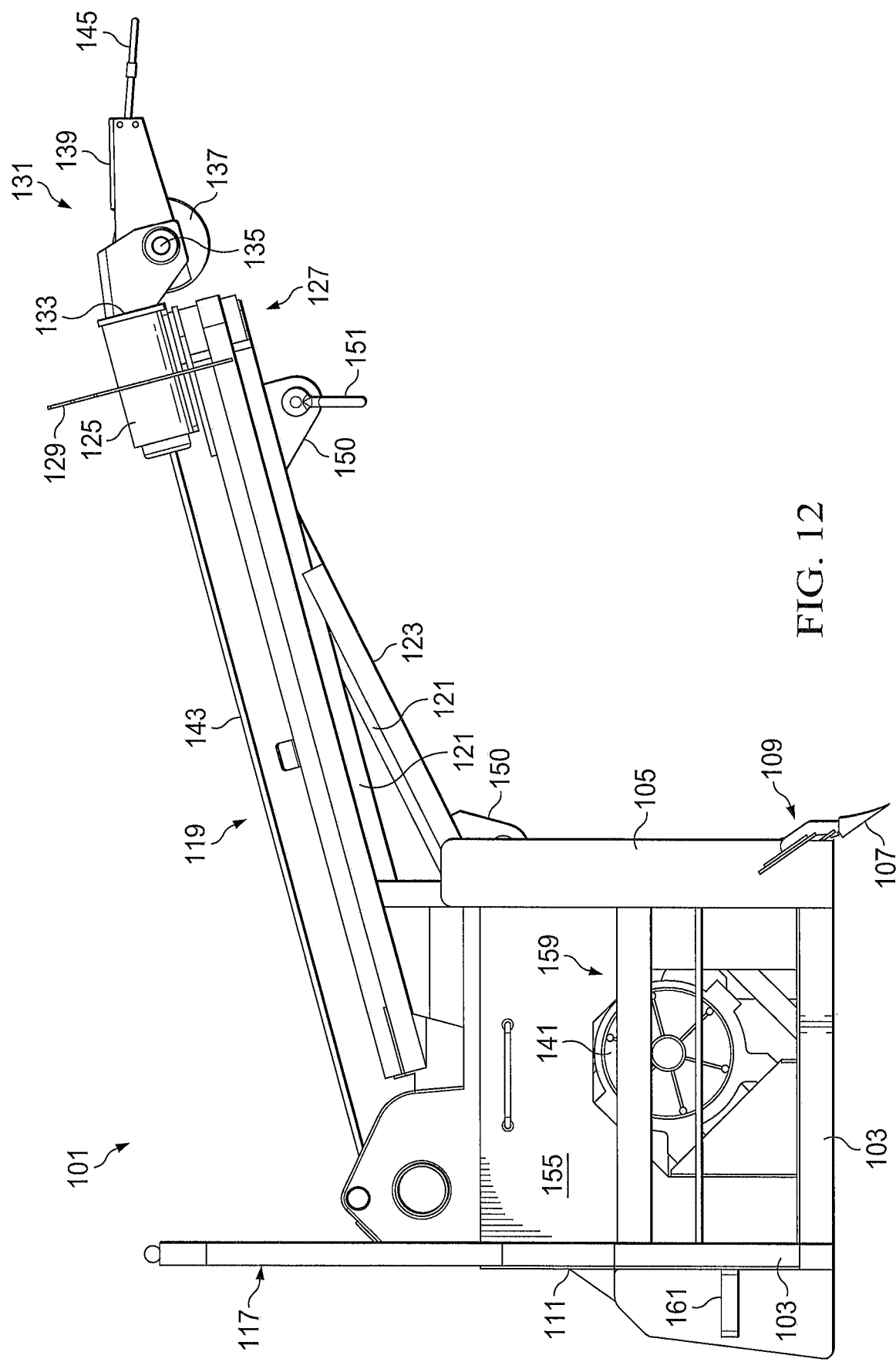
FIGS. 12-14 are side views illustrating the range of motion of the cable guide pivoting in the horse head assembly according to the preferred embodiment.
Figure 13:
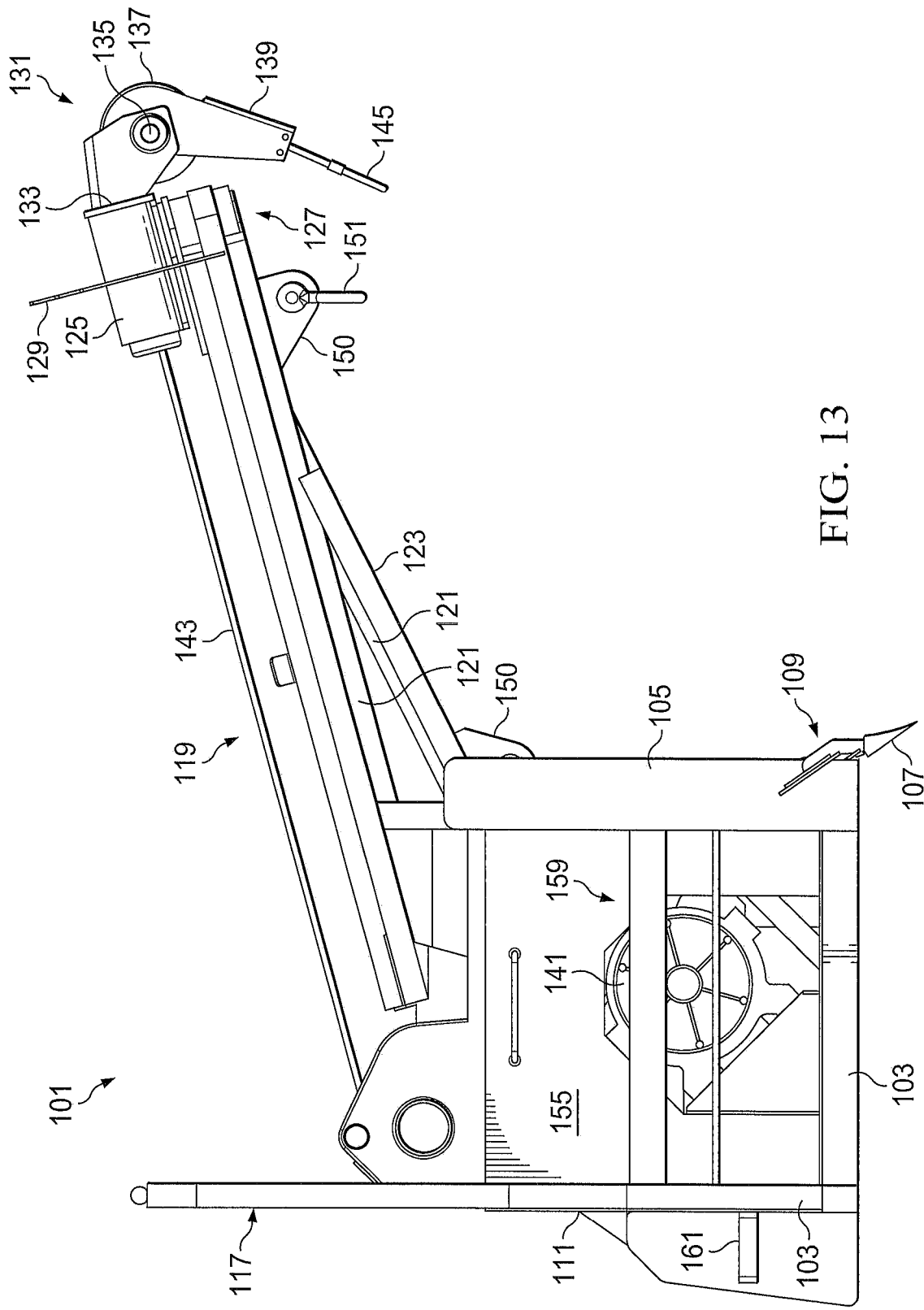
Figure 14:
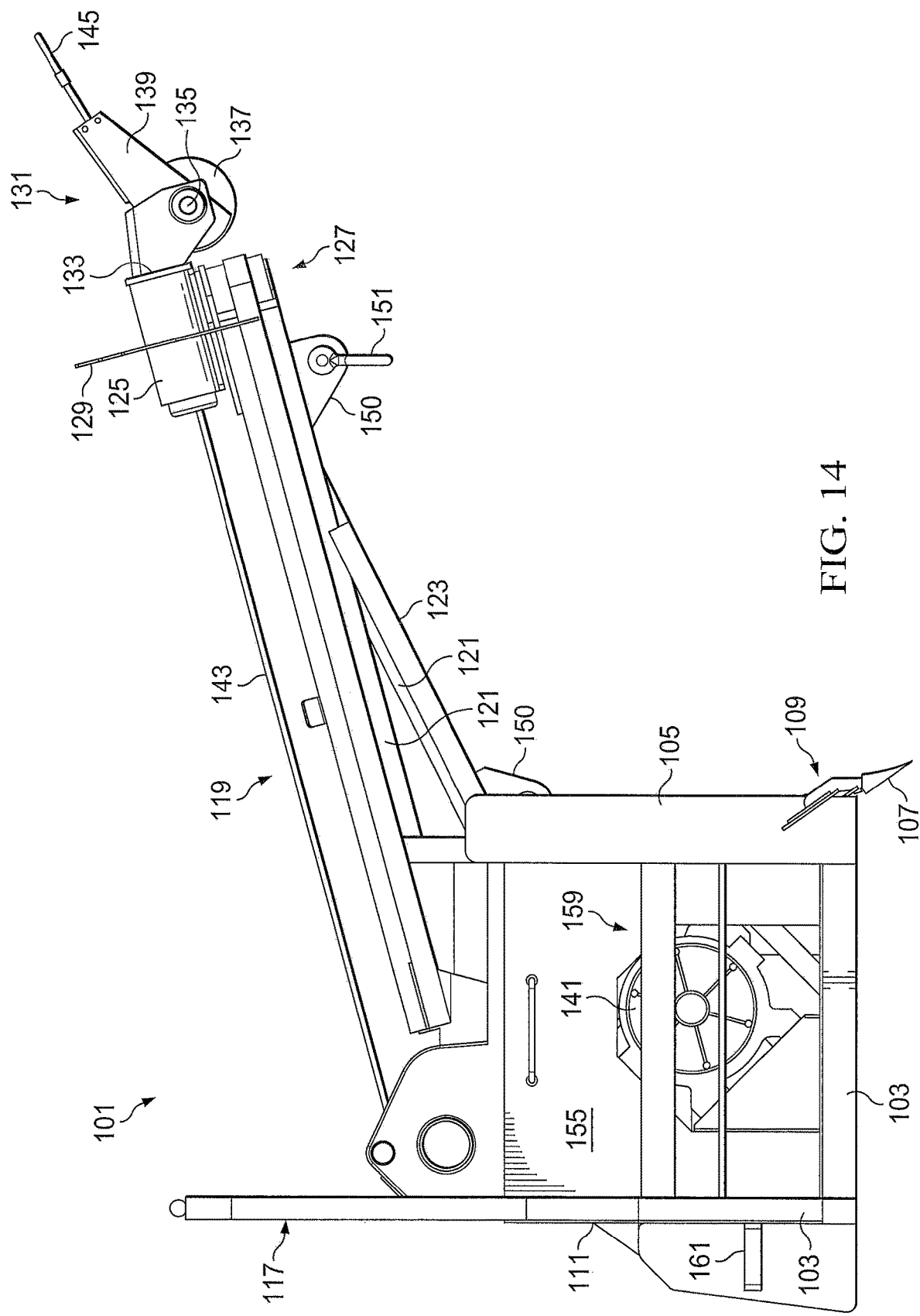

Referring now to FIGS. 12-14, the pivoting of cable guide 139 on clevis pin 135 is illustrated. FIG. 12 shows cable guide 139 in a first position, extending from clevis pin 135. FIG. 13 shows cable guide 139 in a second position. It should be understood that the position of cable guide 139 is determined by the direction of cable 143 as it extends forward from sheave wheel 137. In operation, cable 143 runs along sheave wheel 137, sheave wheel 137 rotating on clevis pin 135 when cable 143 extends or retracts. It should also be understood that cable guide 139 may rotate above the first position shown in FIG. 12.

FIG. 14 shows cable guide 139 in an over-extended position wherein the rotation of cable guide 139 is limited by it contacting clevis 133. It should be understood that in the over-extended position, cable 143 is not supported on sheave wheel 137 and instead is suspended over sheave wheel 137 due to the angle of cable 143. Therefore, in operation according to the preferred embodiment, horse head assembly 131 would preferably be rotated into such a position that cable 143 could extend upward at a large angle while remaining on sheave wheel 137. For example, horse head assembly 131 could be rotated into a roughly upside-down position (not shown) as compared to the neutral position seen in FIG. 6, cable 143 thereby remaining supported by sheave wheel 137.

It is apparent that a system with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description and claims. Although the present embodiments are shown above, they are not limited to just these embodiments, but are amenable to various changes and modifications without departing from the spirit thereof.

I claim:

1. A vehicle recovery unit, comprising:
   a box-shaped frame;
   a mounting system coupled to the frame, the mounting system being configured for releasable attachment to an operating vehicle;
   a winch carried by the frame, the winch having a tractable cable; and
   a boom assembly supported by the frame, the boom assembly being configured to support the cable.

2. The vehicle recovery unit according to claim 1, wherein the boom assembly is angled upward relative to the frame.

3. The vehicle recovery unit according to claim 1, wherein the boom assembly extends beyond a forward end of the frame.

4. The vehicle recovery unit according to claim 1, further comprising:
   at least one boom attachment member coupled to the boom assembly for receiving attachment devices.

5. The vehicle recovery unit according to claim 1, further comprising:
   at least one frame attachment member coupled to the frame for receiving attachment devices.

6. The vehicle recovery unit according to claim 1, wherein the winch is hydraulically operated.

7. The vehicle recovery unit according to claim 1, wherein the winch is powered by a hydraulic system of the operating vehicle.

8. The vehicle recovery unit according to claim 1, wherein the frame comprises:
   a shield portion extending above a rearward end of the frame.

9. A vehicle recovery unit, comprising:
   a box-shaped frame;
   a mounting system coupled to the frame, the mounting system being configured for releasable attachment to an operating vehicle;
   a winch carried by the frame, the winch having a tractable cable;
   a boom assembly supported by the frame, the boom assembly being configured to support the cable; and
   a blade system coupled to the frame.

10. A vehicle recovery unit, comprising:
    a box-shaped frame;
    a mounting system coupled to the frame, the mounting system being configured for releasable attachment to an operating vehicle;
    a winch carried by the frame, the winch having a tractable cable; and
    a boom assembly supported by the frame, the boom assembly being configured to support the cable;
    wherein the mounting system is a bayonet-type locking system for use on skid-steer type vehicles.

11. A vehicle recovery unit, comprising:
    a box-shaped frame;
    a mounting system coupled to the frame, the mounting system being configured for releasable attachment to an operating vehicle;
    a winch carried by the frame, the winch having a tractable cable;
    a boom assembly supported by the frame, the boom assembly being configured to support the cable; and
    a pivoting assembly coupled to the boom assembly for guiding the cable.

12. The vehicle recovery unit according to claim 11, further comprising:
    a pivoting cable sleeve coupled to the boom assembly for pivotally receiving the pivoting assembly.

13. A vehicle recovery unit, comprising:
    a box-shaped frame;
    a mounting system coupled to the frame, the mounting system being configured for releasable attachment to an operating vehicle;
    a winch carried by the frame, the winch having a tractable cable; and
    a boom assembly supported by the frame, the boom assembly being configured to support the cable;
    wherein the winch is electrically operated.

14. A vehicle recovery unit, comprising:
    a box-shaped frame;
    a mounting system coupled to the frame, the mounting system being configured for releasable attachment to an operating vehicle;
    a winch carried by the frame, the winch having a tractable cable;
    a boom assembly supported by the frame, the boom assembly being configured to support the cable; and
    a control system for controlling the operation of the winch, the control system being disposed at least partially inside the operating vehicle.

15. A vehicle recovery unit, comprising:
    a box-shaped frame;
    a mounting system coupled to the frame, the mounting system being configured for releasable attachment to an operating vehicle;
    a winch carried by the frame, the winch having a tractable cable; and a boom assembly supported by the frame, the boom assembly being configured to support the cable and having reinforcement struts for adding strength to the boom assembly.

16. A vehicle recovery unit, comprising:
a box-shaped frame;
a mounting system coupled to the frame, the mounting system being configured for releasable attachment to an operating vehicle;
a winch carried by the frame, the winch having a tractable cable;
a boom assembly supported by the frame, the boom assembly being configured to support the cable; and
a blade edge disposed on a lower portion of a front end of the frame.

17. The vehicle recovery unit according to claim 16, further comprising:
one or more blade teeth extending down from the blade edge.

18. A vehicle recovery unit, comprising:
a box-shaped frame;
a mounting system coupled to the frame, the mounting system being configured for releasable attachment to an operating vehicle;
a winch carried by the frame, the winch having a tractable cable;
a boom assembly supported by the frame, the boom assembly being configured to support the cable; and
one or more plates coupled to the frame to add strength to the frame.

* * * * *